United States Patent
Shecterle

(10) Patent No.: US 9,573,109 B2
(45) Date of Patent: *Feb. 21, 2017

(54) METHODS AND APPARATUSES FOR ISOMERIZATION OF PARAFFINS

(71) Applicant: UOP LLC, Des Plaines, IL (US)

(72) Inventor: David James Shecterle, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/387,930

(22) PCT Filed: Feb. 14, 2013

(86) PCT No.: PCT/US2013/026011
§ 371 (c)(1),
(2) Date: Sep. 25, 2014

(87) PCT Pub. No.: WO2013/148008
PCT Pub. Date: Oct. 3, 2013

(65) Prior Publication Data
US 2015/0057483 A1    Feb. 26, 2015

(51) Int. Cl.
*B01J 16/00*    (2006.01)
*B01J 37/24*    (2006.01)
(Continued)

(52) U.S. Cl.
CPC ............. *B01J 16/005* (2013.01); *B01J 37/24* (2013.01); *C10G 45/60* (2013.01); *B01J 21/04* (2013.01);
(Continued)

(58) Field of Classification Search
CPC ....... C07C 5/2772; C07C 5/2791; C07C 5/12; C07C 5/13
(Continued)

(56) References Cited

U.S. PATENT DOCUMENTS 2,414,371 A    1/1947   Fragen et al.
3,242,228 A *  3/1966   Riordan .................. B01J 27/13
                                                       502/230
(Continued)

FOREIGN PATENT DOCUMENTS

EP    1792886 A1    6/2007
WO    2007063279 A1   6/2007
WO    2013148008 A1   10/2013

OTHER PUBLICATIONS

Fernandez, "UOP's New Once-Through Hydrogen Penex Technology: A New Perspective to Light Naphtha Isomerization Economics", 1988 NPRA Annual Meeting, Mar. 20-22, 1988, San Antonio, Texas.

(Continued)

*Primary Examiner* — Sharon Pregler

(57) ABSTRACT

Embodiments of methods and apparatuses for isomerization of paraffins are provided. In one example, a method comprises the steps of separating an isomerization effluent into a product stream that comprises branched paraffins and a stabilizer overhead vapor stream that comprises HCl, $H_2$, and $C_6$-hydrocarbons. $C_6$-hydrocarbons are removed from at least a portion of the stabilizer overhead vapor stream to form a HCl and $H_2$-rich stream. An isomerization catalyst is activated using at least a portion of the HCl and $H_2$-rich stream to form a chloride-promoted isomerization catalyst. A paraffin feed stream is contacted with the chloride-promoted isomerization catalyst in the presence of hydrogen for isomerization of the paraffins.

6 Claims, 1 Drawing Sheet

(51) Int. Cl.
*C10G 45/60* (2006.01)
*B01J 21/04* (2006.01)
*B01J 23/42* (2006.01)

(52) U.S. Cl.
CPC ...... *B01J 23/42* (2013.01); *B01J 2219/00006* (2013.01)

(58) Field of Classification Search
USPC ....... 208/133, 134, 135, 136, 137, 138, 139, 208/140, 141; 585/734, 741, 742, 747, 585/748
See application file for complete search history.

(56) References Cited

U.S. PATENT DOCUMENTS

| | | | |
|---|---|---|---|
| 4,048,251 A | 9/1977 | Cahn et al. | |
| 4,680,042 A | 7/1987 | Mehra | |
| 5,326,926 A * | 7/1994 | Rice | C07C 5/226 585/738 |
| 5,705,730 A * | 1/1998 | Zarchy | C07C 5/277 585/737 |
| 7,223,898 B2 * | 5/2007 | Rice | C07C 5/2791 585/734 |
| 2006/0205990 A1 | 9/2006 | Rice | |
| 2008/0245704 A1 | 10/2008 | Nafis et al. | |
| 2008/0275278 A1 | 11/2008 | Clark | |
| 2013/0261358 A1 | 10/2013 | Shecterle | |

OTHER PUBLICATIONS

Lukinskas, "Theoretical study of hydrogen dissociation on dialuminum oxide clusters and aluminum-silicon-oxygen clusters, as models of extraframework aluminum species and zeolite lattice", Applied Catalysis A: General 209 (2001) 193-205.

* cited by examiner

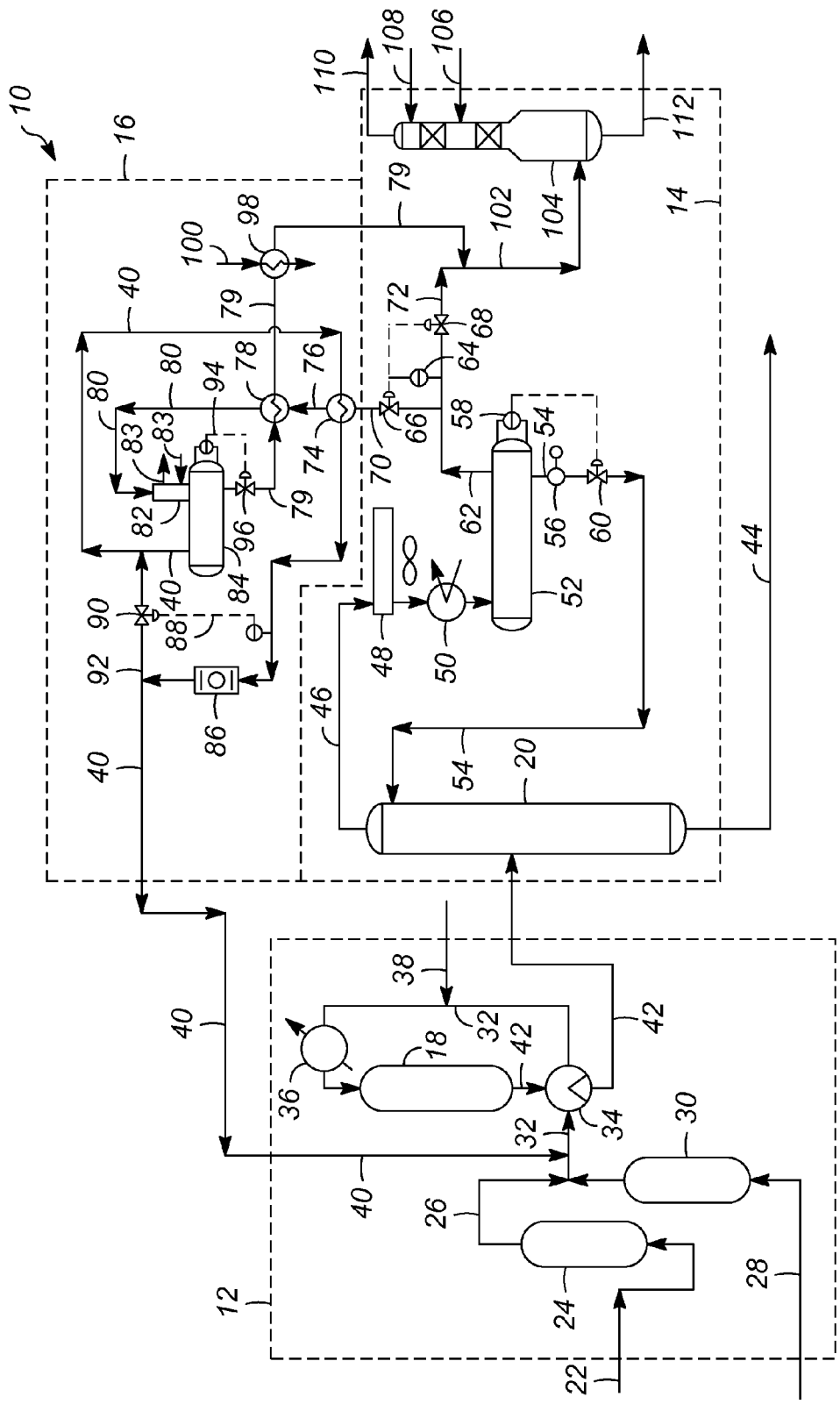

METHODS AND APPARATUSES FOR ISOMERIZATION OF PARAFFINS

CROSS REFERENCE TO RELATED APPLICATIONS

This application is a national stage entry under 35 U.S.C. 371 of International Application No. PCT/US2013/026011 filed Feb. 14, 2013, which claims priority to U.S. application Ser. No. 13/434,657 filed on Mar. 29, 2012, the contents of which are hereby incorporated by reference in its entirety.

TECHNICAL FIELD

The present invention relates generally to methods and apparatuses for isomerization of hydrocarbons, and more particularly relates to methods and apparatuses for isomerization of paraffins using a chloride-promoted isomerization catalyst.

BACKGROUND

Isomerization processes are widely used by many refiners to rearrange the molecular structure of straight chain paraffinic hydrocarbons to more highly branched hydrocarbons that generally have higher octane ratings. Many isomerization processes employ a chlorinated catalyst, such as chlorinated alumina catalyst, chlorinated platinum aluminum catalyst, and the like, in a reaction zone (e.g., refers to an area including one or more reactors). The chlorinated catalyst requires a continuous addition of chloride to replace chloride removed from the surface of the catalyst and carried away in the reaction-zone effluent. Typically, a fresh feed of chloride promoter, such as perchloroethylene, is continuously introduced into a paraffin feed stream upstream from a reactor in the reaction zone. Inside the reactor, the chloride promoter decomposes to form hydrogen chloride that activates, e.g., promotes or regenerates, the catalyst by replenishing the chloride removed from the catalyst's surface.

The reaction-zone effluent generally contains a significant amount of hydrogen chloride from the continuous decomposition of chloride promoter and the removal of chloride from the surface of the catalyst. A product stream containing branched paraffins is separated from the reaction-zone effluent by removing hydrogen chloride and other light volatile hydrocarbons (e.g., $C_5$-hydrocarbons) as a stabilizer overhead vapor stream. Because hydrogen chloride poses environmental and handling concerns, the stabilizer overhead vapor stream is continuously scrubbed with a caustic, such as sodium hydroxide, to neutralize the hydrogen chloride before removing the off-gas stream from the process. The cost of chloride promoters and caustics are relatively expensive, and many refiners would like to reduce their consumption of these components to improve their process efficiencies and reduce overall operational costs.

Accordingly, it is desirable to provide methods and apparatuses for isomerization of paraffins with reduced chloride promoter consumption and/or reduced caustic consumption to improve process efficiencies and reduce overall operational costs. Furthermore, other desirable features and characteristics of the present invention will become apparent from the subsequent detailed description and the appended claims, taken in conjunction with the accompanying drawings and this background.

BRIEF SUMMARY

Methods and apparatuses for isomerization of paraffins are provided herein. In accordance with an exemplary embodiment, a method for isomerization of paraffins comprises the steps of separating an isomerization effluent into a product stream that comprises branched and un-branched paraffins and a stabilizer overhead vapor stream that comprises HCl, $H_2$, and $C_6$-hydrocarbons. $C_6$-hydrocarbons are removed from at least a portion of the stabilizer overhead vapor stream to form a HCl and $H_2$-rich stream. An isomerization catalyst is activated using at least a portion of the HCl and $H_2$-rich stream to form a chloride-promoted isomerization catalyst. A paraffin feed stream is contacted with the chloride-promoted isomerization catalyst in the presence of hydrogen for isomerization of the paraffins.

In accordance with another exemplary embodiment, a method for isomerization of paraffins is provided. The method comprises the steps of introducing an isomerization effluent to a stabilizer at stabilization conditions effective to form a product stream that comprises branched and un-branched paraffins and a stabilizer overhead vapor stream that comprises HCl, $H_2$, and $C_6$-hydrocarbons. The stabilizer overhead vapor stream is separated in a first separator at first separation conditions into a liquid stream that comprises $C_3^+$ hydrocarbon and a net gas stream that comprises HCl, $H_2$, and $C_5$-hydrocarbons. A $C_5$-hydrocarbons-rich stream and a HCl and $H_2$-rich stream that comprises HCl and $H_2$ are formed from at least a portion of the net gas stream in a second separator at second separation conditions. At least a portion of the HCl and $H_2$-rich stream is introduced to a reactor operating at isomerization conditions to activate an isomerization catalyst contained therein and form a chloride-promoted isomerization catalyst. A paraffin feed stream is contacted with the chloride-promoted isomerization catalyst in the reactor in the presence of hydrogen for isomerization of the paraffins.

In accordance with another exemplary embodiment, an apparatus for isomerization of paraffins is provided. The apparatus comprises a stabilizer configured to receive an isomerization effluent and to operate at stabilization conditions effective to separate the isomerization effluent into a product stream and a stabilizer overhead vapor stream. The product stream comprises branched and un-branched paraffins and the stabilizer overhead vapor stream comprises HCl, $H_2$, and $C_5$-hydrocarbons. A first separator is configured to receive the stabilizer overhead vapor stream and to operate at first separation conditions effective to separate the stabilizer overhead vapor stream into a liquid stream that comprises $C_3^+$ hydrocarbon and a net gas stream that comprises HCl, $H_2$, and $C_5$-hydrocarbons. A second separator is configured to receive at least a portion of the net gas stream and to operate at second separation conditions effective to separate the at least the portion of the net gas stream into a $C_5$-hydrocarbons-rich stream and a HCl and $H_2$-rich stream that comprises HCl and $H_2$. A reaction zone contains an isomerization catalyst. The reaction zone is configured to receive at least a portion of the HCl and $H_2$-rich stream and a paraffin feed stream and to operate at isomerization conditions to activate the isomerization catalyst to form a chloride-promoted isomerization catalyst. The chloride-promoted isomerization catalyst is for contact with the paraffin feed stream in the presence of hydrogen for isomerization of the paraffins.

BRIEF DESCRIPTION OF THE DRAWINGS

The present invention will hereinafter be described in conjunction with the following drawing figures, wherein like numerals denote like elements, and wherein:

FIG. 1 schematically illustrates an apparatus and method for isomerization of paraffins in accordance with an exemplary embodiment.

DETAILED DESCRIPTION

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to methods and apparatuses for isomerization of paraffins. Unlike the prior art, the exemplary embodiments taught herein introduce an isomerization reaction-zone effluent from an isomerization reaction zone to a stabilizer. The isomerization reaction-zone effluent comprises HCl, $H_2$, branched paraffins, and $C_7$-hydrocarbons. As used herein, $C_X$ means hydrocarbon molecules that have "X" number of carbon atoms, $C_X+$ means hydrocarbon molecules that have "X" and/or more than "X" number of carbon atoms, and $C_X-$ means hydrocarbon molecules that have "X" and/or less than "X" number of carbon atoms. The stabilizer is operating at stabilization conditions effective to separate the isomerization reaction-zone effluent into a product stream that comprises the branched paraffins and a stabilizer overhead vapor stream that comprises HCl, $H_2$, and $C_6$-hydrocarbons.

Next, a portion of the $C_6$-hydrocarbons are removed from at least a portion of the stabilizer overhead vapor stream to form a HCl and $H_2$-rich stream. In an exemplary embodiment, $C_6$-hydrocarbons are removed from at least a portion of the stabilizer overhead vapor stream using a first separator and a second separator that is in fluid communication with the first separator. In particular, the stabilizer overhead vapor stream is introduced to the first separator at separation conditions effective to form a liquid stream that comprises $C_3^+$ hydrocarbon and a net gas stream that comprises HCl and $C_5$-hydrocarbons. The liquid stream is directed back to the stabilizer for reflux. In an exemplary embodiment, the net gas stream is divided into a first portion and a second portion. The first portion of the net gas stream is introduced to the second separator at separation conditions effective to form a $C_5$-hydrocarbons-rich stream and a HCl and $H_2$-rich stream. The $C_5$-hydrocarbons-rich stream, which is substantially depleted of HCl, is heated and combined with the second portion of the net gas stream to form a combined stream that is directed to a scrubber for treatment with a caustic. Because the $C_5$-hydrocarbons-rich stream is substantially free of HCl, the amount of HCl in the combined stream is reduced and thus, less caustic is required to neutralize the HCl. Therefore, caustic consumption can be reduced for the isomerization process.

In an exemplary embodiment, at least a portion of the HCl and $H_2$-rich stream is introduced to a reactor in the isomerization reaction zone. The reactor contains an isomerization catalyst and is operating at isomerization conditions. The isomerization catalyst is contacted with the HCl and $H_2$-rich stream to activate the isomerization catalyst by replenishing chloride removed from the surface of the isomerization catalyst, forming a chloride-promoted isomerization catalyst. Because the HCl and $H_2$-rich stream is used to activate the isomerization catalyst, less chloride promoter is required for activating the isomerization catalyst. Therefore, chloride promoter consumption can be reduced for the isomerization process. Since $H_2$ is also contained in the HCl and $H_2$-rich stream, less makeup hydrogen is required and hydrogen consumption is reduced. A feed stream containing paraffins is introduced to the reactor and contacts the chloride-promoted isomerization catalyst in the presence of hydrogen to isomerize the paraffins and form branched paraffins.

Referring to FIG. 1, a schematic depiction of an apparatus 10 for isomerization of paraffins is provided. The apparatus 10 is utilized for a paraffin isomerization process that converts normal paraffins to branched paraffins. The apparatus 10 comprises a reaction zone 12, a stabilizing-scrubbing zone 14, and a separation-recycle zone 16.

The reaction zone 12 and the stabilizing-scrubbing zone 14 include a reactor 18 and stabilizer 20 (e.g., distillation column), respectively, that are in fluid communication. A paraffin feed stream 22 is passed through a dryer 24 for removing water and to form a dried paraffin feed stream 26. In one embodiment, the paraffin feed stream 22 is rich in $C_4$ hydrocarbons, such as n-butane and may also contain relatively small amounts of isobutane, pentane, and heavier materials (e.g., $C_6^+$ hydrocarbons). In another embodiment, the paraffin feed stream 22 is rich in $C_5$ and/or $C_6$ hydrocarbons, such as normal pentane and normal hexane.

In an exemplary embodiment, a hydrogen-containing gas feed 28 is passed through a dryer 30 for removing water and is combined with the dried paraffin feed 26 to form a combined stream 32. The combined stream 32 is passed through a heat exchanger 34 and a heater 36. As illustrated and will be discussed in further detail below, a chloride promoter stream 38 (e.g., containing perchloroethylene or the like) is introduced to the combined stream 32 between the heat exchanger 34 and the heater 36, and a HCl and $H_2$-rich stream 40 (e.g., containing 0.1 weight percent (wt. %) or greater of HCl) is introduced to the combined stream 32 upstream from the heat exchanger 34. In an exemplary embodiment, the heat exchanger 34 and the heater 36 together heat the combined stream 32 to a temperature of from 90 to 210° C. for introduction to the reactor 18.

In an exemplary embodiment, the reactor 18 is a fixed-bed catalytic reactor operating at a temperature of from 90 to 210° C. and contains an isomerization catalyst that is activated by HCl from the HCl and $H_2$-rich stream 40 and further, by the decomposition of chloride promoter from the chloride promoter stream 38 to form a high-activity chloride-promoted isomerization catalyst. Non-limiting examples of the isomerization catalyst include alumina catalyst, platinum aluminum catalyst, and the like that can be chlorinated. The chloride-promoted isomerization catalyst in the presence of hydrogen is effective to isomerize the normal paraffins to branched paraffins (e.g., iso-butane, branched pentane, branched hexane, or combinations thereof) to produce an isomerization reaction-zone effluent 42. The isomerization reaction-zone effluent 42 contains the branched paraffins, other $C_7$-hydrocarbons including un-branched paraffins, $H_2$, HCl, and possibly other chloride-containing compounds.

The isomerization reaction-zone effluent 42 is passed through the heat exchanger 34 to cool the effluent 42 to a temperature of from 65 to 165° C. The isomerization reaction-zone effluent 42 is then introduced to the stabilizer 20. The stabilizer 20 separates the isomerization reaction-zone effluent 42 into a product stream 44 and a stabilizer overhead vapor stream 46. The stabilizer overhead vapor stream 46 contains HCl, $H_2$, and $C_6$-hydrocarbons. The product stream 44 contains branched and un-branched paraffins and is removed from the stabilizing-scrubbing zone 14.

In an exemplary embodiment, the stabilizer overhead vapor stream 46 is passed through an air cooler 48 and a partial condenser 50 that together cool the stabilizer overhead vapor stream 46 to a temperature of from 30 to 60° C. The stabilizer overhead vapor stream 46 is then introduced to a separator 52 for separation. A liquid stream 54 containing $C_3^+$ hydrocarbon is removed from the separator 52 and is passed through a pump 56. A level controller 58 including a control valve 60 controls the flow of the liquid stream 54 back to the stabilizer 20 for reflux.

Volatiles are removed from the separator 52 and form a net gas stream 62. The net gas stream 62 contains HCl, $H_2$, and $C_5$-hydrocarbons. In an exemplary embodiment, the net gas stream 62 is removed from the separator 52 at a pressure of from 700 to 2,100 kPa. As illustrated, a pressure controller 64 along with control valves 66 and 68 are used to divide the net gas stream 62 into portions 70 and 72, respectively.

In an exemplary embodiment, the portion 70 of the net gas stream 62 is introduced to the separation-recycle zone 16. As illustrated, the portion 70 is passed through a heat exchanger 74 for indirect heat exchange with the HCl and $H_2$-rich stream 40 to form a first partially-cooled net gas stream 76. In an exemplary embodiment, the heat exchanger 74 cools the portion 70 to form the first partially-cooled net gas stream 76 that has a temperature of from −7 to 38° C.

The first partially-cooled net gas stream 76 is passed through a heat exchanger 78 for indirect heat exchange with a $C_5$-hydrocarbons-rich stream 79 (discussed in further detail below) to form a second partially-cooled net gas stream 80. In an exemplary embodiment, the heat exchanger 78 cools the first partially-cooled net gas stream 76 to form the second partially-cooled net gas stream 80 that has a temperature of from −18 to 32° C.

The second partially-cooled net gas stream 80 is then passed through a heat exchanger 82 for indirect heat exchange with a refrigerant 83, e.g., propane or the like, and is introduced to a separator 84. As illustrated, the heat exchanger 82 may be mounted directly on the separator 84, or alternatively, may be positioned upstream from the separator 84. In an exemplary embodiment, the heat exchanger 82 further cools the second partially-cooled net gas stream 80 to a temperature of from −40 to 5° C. before introduction to the separator 84.

The separator 84 separates the second partially-cooled net gas stream 80 into the HCl and $H_2$-rich stream 40 and the $C_5$-hydrocarbons-rich stream 79. In an exemplary embodiment, the HCl and $H_2$-rich stream 40 comprises HCl present in an amount of 0.1 wt. % or greater, such as from 0.2 to 0.7 wt. %, and $H_2$. In an exemplary embodiment, the $C_5$-hydrocarbons-rich stream 79 contains primarily $C_5$-hydrocarbons and is substantially depleted of HCl and $H_2$.

As illustrated, the HCl and $H_2$-rich stream 40 is passed through the heat exchanger 74 for indirect heat exchange with the portion 70 of the net gas stream 62 as discussed above. In an exemplary embodiment, the heat exchanger 74 heats the HCl and $H_2$-rich stream 40 to a temperature of from −7 to 25° C. The HCl and $H_2$-rich stream 40 is then passed through a compressor 86. In an exemplary embodiment, the compressor 86 pressurizes the HCl and $H_2$-rich stream 40 to a pressure of from 1,700 to 3,500 kPa.

As illustrated, a flow controller 88 including a control valve 90 is used to selectively divert a spillback stream 92 from the HCl and $H_2$-rich stream 40 as needed (.e.g., normally the spillback stream 92 is "no flow"). The spillback stream 92, when flowing, is pressurized and returned to the HCl and $H_2$-rich stream 40 upstream from the heat exchanger 74. The remaining portion of the HCl and $H_2$-rich stream 40 is passed along from the compressor 86 and is combined with the combined streams 32 for introduction to the reactor 18 together with the chloride promoter stream 38.

As discussed above, once introduced to the reactor 18, HCl from the from the HCl and $H_2$-rich stream 40 and further from the decomposition of chloride promoter from the chloride promoter stream 38 contacts and activates the isomerization catalyst by replenishing chloride removed from the surface of the isomerization catalyst. Because the HCl and $H_2$-rich stream 40 is used to activate the isomerization catalyst, less chloride promoter is required from the chloride promoter stream 38 for activating the isomerization catalyst.

As illustrated, a level controller 94 including a control valve 96 is used to control the flow of the $C_5$-hydrocarbons-rich stream 79 leaving the separator 84. The $C_5$-hydrocarbons-rich stream 79 is passed through the heat exchanger 78 for indirect heat exchange with the first partially-cooled net gas stream 76 as discussed above. In an exemplary embodiment, the $C_5$-hydrocarbons-rich stream 79 is heated to a temperature of from −18 to 15° C.

The $C_5$-hydrocarbons-rich stream 79 is then passed through a heat exchanger 98 for indirect heat exchange with a heat transfer fluid 100, such as steam. In an exemplary embodiment, the heat exchanger 98 heats the $C_5$-hydrocarbons-rich stream 79 to a temperature of from 30 to 70° C. The $C_5$-hydrocarbons-rich stream 79 is passed from the heat exchanger 98 and combined with the portion 72 of the net gas stream 62 to form a combined stream 102. As illustrated, the combined stream 102 is introduced to a scrubber 104. The scrubber 104 scrubs the combined stream 102 by neutralizing any HCl contained therein with a caustic 106 followed by counter flow contact with water 108 to form a neutralized stream 110 and a caustic waste stream 112.

Accordingly, methods and apparatuses for isomerization of paraffins have been described. The exemplary embodiments taught herein introduce an isomerization reaction-zone effluent from an isomerization reaction zone to a stabilizer. The isomerization reaction-zone effluent comprises HCl, $H_2$, branched paraffins, and $C_7$-hydrocarbons. The stabilizer separates the isomerization reaction-zone effluent into a product stream that comprises the branched paraffins and a stabilizer overhead vapor stream that comprises HCl and $C_6$-hydrocarbons. The stabilizer overhead vapor stream is introduced to a first separator to remove $C_3^+$ hydrocarbons and form a net gas stream that comprises HCl, $H_2$, and $C_5$-hydrocarbons. The net gas stream is divided into a first portion and a second portion. The first portion is introduced to the second separator to form a $C_5$-hydrocarbons-rich stream and a HCl and $H_2$-rich stream. The $C_5$-hydrocarbons-rich stream, which is substantially depleted of HCl, is heated and combined with the second portion to form a combined stream that is directed to a scrubber for treatment with a caustic. Because the $C_5$-hydrocarbons-rich stream is substantially free of HCl, the amount of HCl in the combined stream is reduced and thus, less caustic is required to neutralize the HCl. The HCl and $H_2$-rich stream is introduced to a reactor in the isomerization reaction zone. The reactor contains an isomerization catalyst that is contacted with the HCl and $H_2$-rich stream to form a chloride-promoted isomerization catalyst. Because the HCl and $H_2$-rich stream is used to activate the isomerization catalyst, less chloride promoter is required for activating the isomerization catalyst.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for isomerization of paraffins, the method comprising the steps of:
- separating an isomerization effluent (42) into a product stream (44) that comprises branched and un-branched paraffins and a stabilizer overhead vapor stream (46) that comprises HCl, $H_2$, and $C_{6-}$ hydrocarbons;
- separating the stabilizer overhead vapor stream (46) in a first separator at first separation conditions effective to form a liquid stream (54) that comprises $C_{3+}$ hydrocarbons and a net gas stream (62) that comprises HCl, $H_2$, and $C_{5-}$ hydrocarbons;
- separating at least a portion of the net gas stream (62) in a second separator at second separation conditions effective to obtain a $C_{5-}$ hydrocarbons-rich stream (79) and an HCl and $H_2$-rich stream (40);
- activating an isomerization catalyst using at least a portion of the HCl and $H_2$-rich stream (40) to form a chloride-promoted isomerization catalyst; and
- contacting a paraffin feed stream (22) with the chloride-promoted isomerization catalyst in the presence of hydrogen for isomerization of the paraffins.

2. The method of claim 1, wherein the first separation conditions comprise a first separation temperature of from 30 to 60° C.

3. The method of claim 1, wherein the first separation conditions comprise a first separation pressure of from 700 to 2,100 kPa gauge.

4. The method of claim 1, further comprises:
- dividing the net gas stream (62) into a first portion (70) and a second portion (72);
- sending the first portion (70) to the second separator; and
- neutralizing the second portion (72) of the net gas stream (62) with a caustic (106).

5. The method of claim 1, wherein the second separation conditions comprise a second separation temperature of from −40 to 5° C.

6. The method of claim 1, wherein the second separation conditions comprise a second separation pressure of from 1,200 to 2,100 kPa gauge.

* * * * *